March 15, 1960  L. H. WADSWORTH  2,928,275
BEARING TESTER
Filed June 20, 1955  2 Sheets-Sheet 1
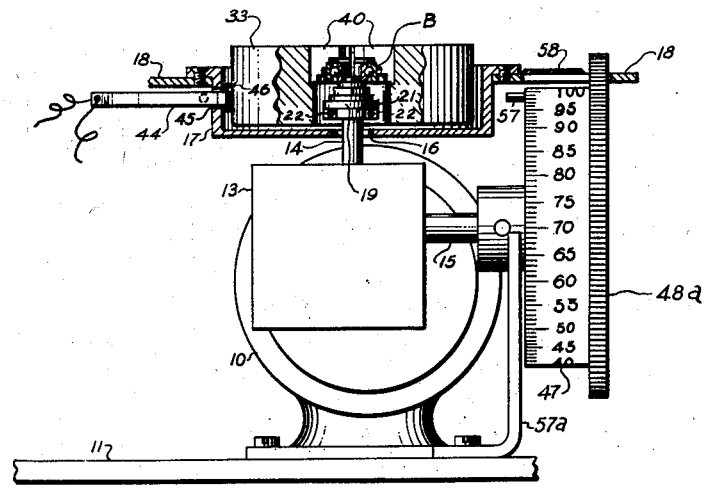
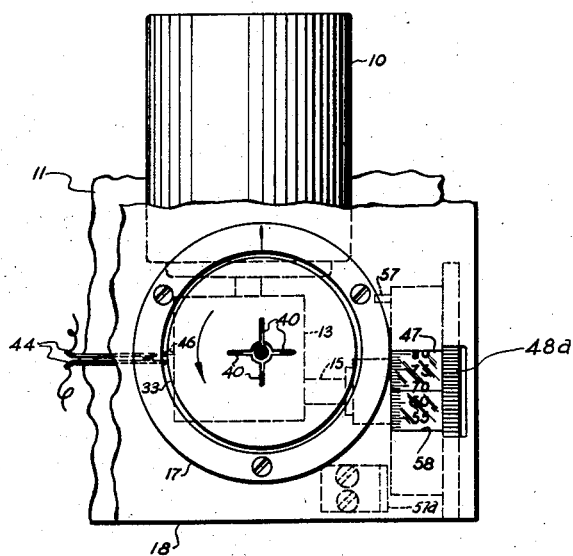
INVENTOR.
LESLIE H. WADSWORTH
BY
Charles P. Boberg
ATTORNEY March 15, 1960 L. H. WADSWORTH 2,928,275
BEARING TESTER
Filed June 20, 1955 2 Sheets-Sheet 2
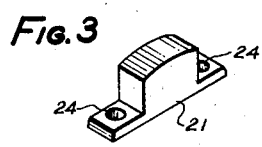
FIG. 3
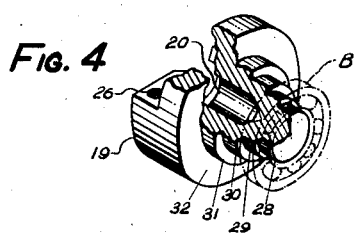
FIG. 4
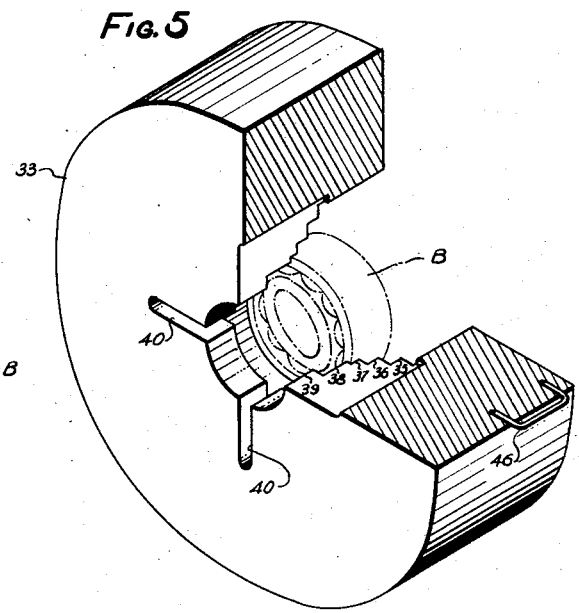
FIG. 5
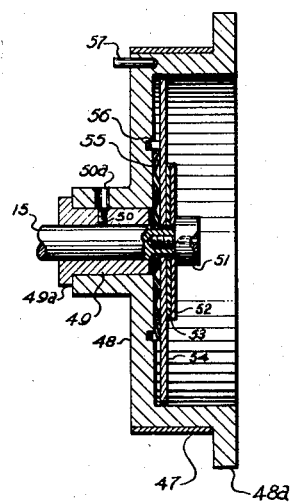
FIG. 6
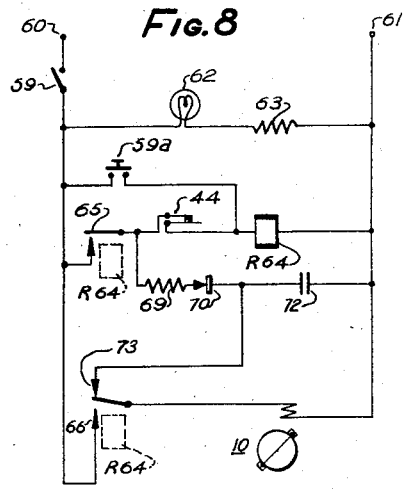
FIG. 7
FIG. 8
INVENTOR.
LESLIE H. WADSWORTH
BY
Charles P. Boberg
ATTORNEY

United States Patent Office 2,928,275
Patented Mar. 15, 1960

2,928,275
BEARING TESTER

Leslie H. Wadsworth, New York, N.Y., assignor to Control Instrument Company, Brooklyn, N.Y., a corporation of New York Application June 20, 1955, Serial No. 516,441

6 Claims. (Cl. 73—9)

This invention relates to testing apparatus, and more particularly to apparatus for determining the resistance to relative turning between the inner and outer ball races of a ball bearing.

In many types of equipment, particularly those which involve precision instruments, the amount of torque available for turning the rotatable parts is very small. The resistance to turning of each bearing consequently is an important factor which must be considered in designing such equipment. With a view to preventing excessive bearing loads, instrument manufacturers and those responsible for procuring instruments have established definite limits on the torque necessary to turn bearings. Testing devices of several kinds have been developed to measure the amount of resistance to turning which is present between the races of a ball bearing in order to determine whether or not the bearing will perform satisfactorily while in service. In some of these testers the bearing is loaded by a pendulum or spring which is employed in such a manner as to indicate the maximum torque required to turn the bearing. This requires very careful observation and it has the disadvantage that only the maximum torque, not the average torque, is measured. Usually one is interested in the average torque required to turn a bearing through a given angle. In another type of tester the bearing is loaded magnetically. While this enables one to obtain the desired information as to the average torque required to turn the bearing, the apparatus requires frequent calibration and therefore is suited only to laboratory conditions. Still other forms of bearing testers have been proposed, but they, too, have disadvantages similar to those already mentioned.

The present invention has for its principal object the provision of an instrument suited for practical use which can accurately measure the average resistance to relative turning between the races of a ball bearing.

Another object of the present invention is to provide an instrument of this character whereby bearings of a large variety of sizes can be tested.

Still another important object of this invention is to provide a means for testing and comparing bearings which does not introduce any variable other than the quality of the bearing under test.

A further object of this invention is the provision of a bearing test instrument having provisions whereby the load on the bearing undergoing test can readily be changed.

Still another object of this invention is the provision of a bearing test instrument having practically uniform operating characteristics at all temperatures so that it can be utilized in environmental testing of bearings whose performance varies with changes in the ambient temperature.

Other objects and features of the invention will become obvious upon consideration of the drawings and description which are presented to illustrate the inventive concept involved and are not meant to define the limits thereof, reference being had to the appended claims for this purpose.

In the drawings:

Fig. 1 is a vertical projection of a bearing tester constructed in accordance with the principles of the invention, certain parts being shown in section for greater clarity.

Fig. 2 is a plan view of the device shown in Fig. 1.

Fig. 3 is an isometric view of a fastener for an adapter utilized in this device.

Fig. 4 is a partially sectioned, isometric view of the adapter, with a phantom showing of a ball bearing positioned thereon.

Fig. 5 is a partially sectioned, isometric view of a body employed as an inertial load in the tester, with a phantom showing of a ball bearing positioned therein.

Fig. 6 is a sectional view of the indicator dial subassembly.

Fig. 7 is a plan view of a friction spring utilized in the indicator dial subassembly.

Fig. 8 is a circuit diagram of the electrical connections and motor controls used in the illustrated embodiment of the invention.

The illustrated bearing tester is powered by a synchronous motor 10, Figs. 1 and 2, rigidly mounted on a base 11. The output of the motor 10 is delivered through a gear box 13 to two shafts 14 and 15 which extend from the gear box 13. The shaft 14 is shown as vertical while the shaft 15 is horizontal, but in practice this relationship can be varied without departing from the inventive principle. The shafts 14 and 15 are driven by the motor 10 at known, constant speeds. The embodiment described herein contemplates ratios of gearing in the gear box 13 such that for an assumed motor speed of 1800 r.p.m., shafts 14 and 15 will rotate at 75 r.p.m. and 4 r.p.m., respectively. However, it should be understood that these values are illustrative only and that other shaft speeds can be used.

As shown best in Fig. 1, the shaft 14 extends upwardly through a clearance hole 16 in a stationary cup 17 which is fastened to a frame or casing 18 (fragmentarily represented in Figs. 1 and 2). The cup-shaped member 17 is merely a convenient means for protectively enclosing certain portions of the instrument and does not constitute an essential part of the invention. An adapter 19, which is shown in greater detail in Fig. 4, is mounted on the upper end of the shaft 14, the latter being received in a socket opening 20 centrally located in the adapter 19 is secured to the shaft 14 for rotation therewith. Screws 22, Fig. 1, which pass through openings 24, Fig. 3, in the fastener 21 are threaded into tapped openings as 26, Fig. 4, in the adapter 19. Fastener 21 is merely a suggested means for securing the adapter 19 to the upper end of shaft 14.

The bearing B which is undergoing test is shown in full lines in Fig. 1 and in phantom outline in Figs. 4 and 5. This bearing B is seated on the adapter 19, with the inner race of the bearing encircling one of several circular ledges or shoulders on the adapter 19 which are graduated to accommodate different sizes of bearings. Each ledge 28, 29, 30 and 31, Fig. 4, has an outside diameter approximately equal to the inside diameter of a particular size bearing which may be tested. It is intended that the fit between the inner bearing race and the adapter 19 will be sufficiently snug so that the inner race will rotate with the shaft 14 when the latter is turning. Adapter 19, as illustrated, will accommodate four sizes of bearings, but of course this number can be varied by suitable design of the adapter.

When the bearing under test is encircling a particular ledge of the adapter 19, the adjoining ledge or shoulder of greater diameter supports the inner race of the bearing to prevent axial movement thereof. Therefore, the adapter 19 is so constructed that the outside diameter of the shoulder 32 or of any of the ledges 31, 30 and 29 will not exceed that of an inner bearing race which is embracing the adjoining ledge of lower diameter. For example, the outside diameter of ledge 29 of adapter 19 is no greater than the outside diameter of the inner race of a bearing which will encircle ledge 28 for test, and the outside diameter of shoulder 32 which will support a bearing inner race encircling ledge 31 is limited in like manner.

The bearing B is loaded by a body 33 of known mass or inertia, Figs. 1 and 2, which is seated on the outer race of this bearing. Body 33, which is shown in greater detail in Fig. 5, is generally cylindrical in shape, having a hollowed-out portion of stepped configuration to receive the outer bearing race. Each of the internal steps 35, 36, 37 and 38 of the body 33 has a diameter such that it will afford a snug fit between the body and the outer race of a particular size bearing which may be tested. Body 33 therefore will rotate with the outer bearing race at all times. The widths of steps 35, 36, 37 and 38 and shoulder 39 are limited so that only the outer race of a bearing B under test will be in contact with the body 33. Radial slots 40 in the body 33, Figs. 2 and 5, facilitate the removal of bearing B after it has been tested. Since the amount of the load on bearing B depends upon the mass and radius of gyration of the body 33, a bearing may be tested under different load conditions simply by substituting for body 33 a body of different mass or radius.

Electrical contacts 44, Figs. 1, 2 and 8, mounted on frame 18 but insulated therefrom, extend through an opening 45 in the cup 17 in order to cooperate with a pin 46 which is attached to the periphery of body 33. Fig. 5 shows the manner in which pin 46 is attached to the body 33, and Figs. 1 and 2 show the pin 46 about to engage one of the contacts 44 for a purpose which will be explained shortly. The contacts 44 normally are closed, being opened only when struck by the revolving pin 46, as will be described later.

An indicator dial 47, Figs. 1 and 2, attached to the end of the shaft 15 is adapted to furnish a measure of elapsed time or of the average torque, depending upon the calibration. In this instance the dial 47 is marked with divisions numbered from 0 to 150, each of which represents 0.10 second of time when the shaft 15 is rotating at its intended sped of 4 r.p.m. Other forms of calibration or arbitrary markings may be used if desired.

The manner in which indicator dial 47 is mounted on shaft 15 is illustrated in Fig. 6. The dial 47 proper is supported by a cup 48 which is fitted loosely on a bushing 49, the latter being fastened to the shaft 15 by set screw 50. Hole 50a in the cup 48 allows access to set screw 50. Cup 48 is prevented from moving axially toward gear box 13 by shoulders 49a on the bushing 49. A headed set screw 51 is threaded into the end of shaft 15 and holds discs 52, 53 and 54 against a circular spring 55 (Fig. 7) which is fitted into a circular slot 56, Fig. 6, in cup 48. Spring 55, Fig. 7, is crimped as at 55a and 55b throughout its length. Its function is to provide frictional forces sufficient to prevent relative motion between shaft 15 and indicator cup 48 when shaft 15 is being rotated by the motor. Rotational motion of shaft 15 can therefore be transmitted to dial 47. The frictional force exerted by spring 55, while it is sufficient to enable cup 48 to be rotated by shaft 15, can easily be overcome by an operator manually turning the cup 48 to position the dial 47 when shaft 15 is not rotating. A knurled rim portion 48a of the cup 48 facilitates this manipulation of the cup 48 and dial 47. A pin 57, Figs. 1 and 6, inserted in the cup 48 is adapted to cooperate with a stationary bar 57a, Fig. 1, to afford a stop device which facilitates setting dial 47 to its zero position. The dial 47 is viewed through a window 58 in the top of case 18.

Fig. 8 is a diagram of the electrical circuits used to control the operation of the instrument. These will be described in detail presently. All parts of the circuitry are shown in their normal condition in Fig. 8.

Bearing B, Figs. 1, 4 and 5, represents a typical bearing which is to be tested in order to determine its resistance to turning between the inner and outer races thereof. Bearing B is placed by an operator upon the adapter 19 so that its inner race fits snugly on the appropriate ledge of this adapter. The body 33 then is placed upon the outer race of the bearing B with the pin 46 thereon positioned adjacent to the contacts 44 (i.e., just past the contacts 44 in the direction of rotation). Cup 48 and dial 47 are turned manually by the operator until pin 57 touches the bar or stop 57a, this being the position at which a dial reading of zero is indicated in the center window 58. Switch 59, Fig. 8, then is closed, placing voltage from the line wires 60 and 61 across a lamp 62 and limiting resistor 63, thereby lighting the lamp 62 to indicate that power is available. Start button 59a then is pressed by the operator, causing relay R64 to become energized and close its contacts 65 and 66. At this time the contacts 44 are in their normally closed condition. Hence, the now closed relay contact 65 and the closed contacts 44 provide a hold circuit for relay R64, so that when start button 59a is released by the operator, the relay R64 is maintained in an energized state through its hold circuit. The closing of contact 66 by the energization of relay R64 connects the leads of the synchronous motor 10 to the line. Synchronous motor 10 will drive the shafts 14 and 15 at uniform speeds so long as the relay R64 is maintained energized.

When the inner race of bearing B is rotated, the resistance to relative turning between the races causes a certain amount of torque to be transmitted from the inner race to the outer race, depending largely upon the conditions within the bearing. The torque transmitted to the outer race tends to accelerate the body 33 from its initial state of rest to or toward the rotary speed of the inner bearing race, which is the same as the speed of the shaft 14, Fig. 1. The amount of acceleration imparted to the body 33 depends, of course, upon the moment of inertia of this body and the condition of the bearing B. A poor bearing, that is, one having high resistance to its relative turning between its inner and outer races, will transmit greater torque than a good bearing which has very little resistance to relative turning. Hence, the body 33 will accelerate more rapidly when a poor bearing is being tested than it will when a bearing of good quality is undergoing test.

The average rotary speed of the body 33 as it turns through a given angle starting from rest may be utilized as a measure of bearing quality. However, since it is not convenient to measure average speed, I have devised the means illustrated herein for measuring the amount of time which elapses while the body 33 turns through a given angle starting from a position of rest. The elapsed time, being inversely proportional to the average speed of the body 33, furnishes a comparative measure of bearing quality. That is to say, when a bearing of good quality is being tested, much more time will elapse while the body 33 is being turned through a given angle than when a bearing of poor quality is being tested. The exact manner in which the elapsed time is measured now will be explained.

As described above, the body 33 initially is positioned on the test bearing B so that the pin 46 is just past the contacts 44 in the direction of rotation. The time dial 47 initially is set in its zero position. The start button 59a, Fig. 8, then is closed, starting the motor 10 as previously explained. The motor 10 rotates at its synchronous speed, turning the shafts 14 and 15. As shaft 14 rotates, the torque transmitted through the bearing B causes the body 33 to rotate. At the same time, the indicator dial 47 is rotating so that the series of numerals thereon moves successively past the window 58.

Rotation of the various parts will continue until the body 33 moves into a position where the pin 46 thereon strikes the protruding one of the contacts 44, Fig. 2. The contacts 44 momentarily open when this occurs, thereby breaking the hold circuit for the relay R64, Fig. 8. Relay R64 promptly deenergizes, opening its contacts 65 and 66. The opening of relay contacts 66 breaks the circuit through the winding of motor 10, thereby deenergizing the motor 10.

To prevent overrunning of the motor 10 and time dial 47, a special braking circuit is provided. Referring to Fig. 8, a condenser 72 is arranged so that when relay contact 65 is closed, the condenser 72 is charged through a resistor 69 and diode rectifier 70. This occurs during the interval when the motor 10 is operating. When the motor circuit is broken upon deenergization of relay R64, a back contact 73 of the relay R64 closes at the same time. This places the winding of motor 10 across the terminals of the condenser 72. The consequent excitation of the motor winding by the discharge of condenser 72 creates a magnetic field which dynamically brakes the rotor of the motor 10 and thereby brings the motor 10 almost instantaneously to a stop.

Another method to prevent overrun of the time dial 47 is to incorporate into the control relay 64 an arm consisting of a latch type or friction type brake that will engage the knurled rim of dial 47 upon breaking electric contacts 44, or to incorporate an extra relay for this sole purpose.

Shaft 15 will stop rotating when motor 10 stops running, and the dial 47, as viewed through window 58, will indicate the arc through which shaft 15 has rotated as well as the time consumed in rotating the body 33 through one revolution (assuming this to be the angle of turn). The reading of dial 47 may be taken as an indication of elapsed time, or it may be regarded equally well as a measure of the relative movement between the two bearing races for a given angular movement of body 33, which constitutes the test load. The reading on dial 47 is then an indication of the resistance to turning between the inner and outer races of bearing B for a load equivalent to the body 33. If another bearing is substituted for bearing B and the test repeated again with the same load, the dial reading for the bearings may be compared, and the bearing for which dial 47 turned through the least arc will be the bearing which has the greater resistance between its races. Alternatively, bearing B may be tested with different loads in order to compare the change in its resistance to turning between races resulting from an increased or decreased load.

The instrument described herein may be used also to determine, with the aid of simple calculations, the value of torque required to overcome the resistance to turning between the inner and outer races of a ball bearing. To do this, one must know the mass and radius of gyration of the body 33, the angular distance through which the body 33 has moved, and the angular distance through which the shaft 15 (or the inner race of the bearing) has moved during the same time interval. The angular displacement of the body 33 is limited to one revolution, of course. The angular displacement of shaft 15 or of the inner bearing race is proportionate to the reading of dial 47, which also measures the elapsed time inasmuch as a constant-speed drive is being used. The average torque required to turn the bearing against its internal resistance will be inversely proportionate to the angular movement performed by the shaft 15 or the inner bearing race and directly proportionate to the other factors mentioned above.

The disclosed instrument is small, rugged and easy to manufacture, and it retains its accuracy despite changes in the ambient temperature. It is well adapted for testing the quality of bearings at low or subzero temperatures, because the only variable involved is the quality of the bearing itself, the parts of the instrument being unaffected. Moreover, being self-contained and of a small size, the instrument can readily be placed in a refrigerated compartment and operated from the outside. It has the additional advantage of being suitable for use in practical locations such as shops and assembly lines instead of being confined to laboratories.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

The invention is claimed as follows:

1. An instrument for testing a ball bearing or the like to determine the resistance to relative turning between the races of the bearing, comprising drive means adapted to rotate one of the bearing races at a constant rate, a body adapted for attachment to the other bearing race as an inertia load to be rotated by the torque which is transmitted between the races, and means for measuring the time which elapses while said body is turned through a given angle starting from a position of rest.

2. An instrument for testing a ball bearing or the like to determine the resistance to relative turning between the races of the bearing, comprising drive means adapted to rotate one of the bearing races at a constant rate, a body adapted for attachment to the other bearing race as an inertia load to be rotated by the torque which is transmitted between the races, means for manifesting the completion of a predetermined angular movement by said body, and means for indicating the time which elapsed while said body executed its predetermined angular movement.

3. An instrument for testing a ball bearing or the like to determine the resistance to relative turning between the races of the bearing, comprising drive means adapted to rotate one of the bearing races at a constant rate, a body adapted for attachment to the other bearing race as an inertia load to be rotated by the torque which is transmitted between the races, means for manifesting the completion of a predetermined angular movement by said body, and means controlled by said drive means and said manifesting means for indicating the time which elapsed while said body executed its predetermined angular movement.

4. An instrument for testing a ball bearing or the like to determine the resistance to relative turning between the races of the bearing, comprising rotary drive means adapted to rotate one of the bearing races at a constant rate, indicator means rotatable in timed relation with said drive means, a body adapted for attachment to the other bearing race as an inertia load to be rotated by the torque which is transmitted between the races, and control means responsive to the movement of said body for stopping the rotation of said indicator means when said body has turned through a predetermined angle starting from a given rest position, whereby said indicator means is brought to a position indicative of the resistance to relative turning between the bearing races.

5. An instrument for testing a ball bearing or the like to determine the resistance to relative turning between the races of the bearing, comprising an electric motor adapted to rotate one of the bearing races at a constant rate, indicator means rotated by said motor, a body adapted for attachment to the other bearing race as an inertia load to be rotated by the torque which is transmitted between the races, means for starting said motor when said body occupies an initial rest position, said indicator means being settable in a predetermined starting position when said body is occupying its initial rest position, and control means responsive to the movement of said body for stopping said motor when said body has turned through a predetermined angle starting from its initial rest position, whereby said indicator means is brought to a position indicative of the resistance to relative turning between the bearing races.

6. A bearing testing instrument as set forth in claim 5, wherein said control means includes circuit breaking means for controlling the flow of electric current to said motor, and braking means to prevent rotation of said motor after the current flow is interrupted.

References Cited in the file of this patent

UNITED STATES PATENTS

| | | |
|---|---|---|
| 1,491,050 | Lutz | Apr. 22, 1924 |
| 2,091,022 | Stuart | Aug. 24, 1937 |
| 2,299,895 | Harrall et al. | Oct. 27, 1942 |
| 2,722,824 | Jensen et al. | Nov. 8, 1955 |
| 2,760,366 | Farmer | Aug. 28, 1956 |
| 2,785,566 | Mims | Mar. 19, 1957 |

FOREIGN PATENTS

| | | |
|---|---|---|
| 320,614 | Great Britain | Oct. 16, 1929 |